United States Patent [19]

Percec et al.

[11] Patent Number: 4,699,634

[45] Date of Patent: Oct. 13, 1987

[54] PROCESS FOR THE MODIFICATION OF AROMATIC POLYMERS VIA PHASE TRANSFER CATALYSIS TO PRODUCE POLYARYLENE POLYMERS AND THE USE THEREOF

[75] Inventors: Elena S. Percec, Pepper Pike; George S. Li, Macedonia, both of Ohio

[73] Assignee: The Standard Oil Company, Cleveland, Ohio

[21] Appl. No.: 753,020

[22] Filed: Jul. 8, 1985

[51] Int. Cl.$^4$ .................. C08G 63/76; C08G 65/48; B01D 53/22

[52] U.S. Cl. .......................... 55/16; 55/68; 55/158; 525/462; 525/467; 525/534; 525/537; 525/933; 528/212

[58] Field of Search ............... 525/467, 462, 534, 537, 525/933; 528/212; 55/16, 68, 158; 560/130, 236; 564/355; 568/51, 626

[56] References Cited

U.S. PATENT DOCUMENTS

| | | | |
|---|---|---|---|
| 3,259,520 | 7/1966 | Borman | 428/411.1 |
| 3,262,892 | 7/1966 | Hay | 528/212 |
| 3,262,911 | 7/1966 | Hay | 528/212 |
| 3,406,147 | 10/1968 | Schmukler | 528/212 |
| 3,534,528 | 10/1970 | Porter | 55/16 |
| 3,652,710 | 3/1972 | Holub et al. | 525/397 |
| 3,652,715 | 3/1972 | Holub et al. | 525/146 |
| 3,655,701 | 4/1972 | Darre | 560/236 |
| 3,709,774 | 1/1973 | Kimura | 428/338 |
| 3,735,559 | 5/1973 | Salemne | 55/158 |
| 3,789,052 | 1/1974 | Klebe et al. | 525/467 |
| 3,830,733 | 8/1974 | Spivack et al. | 210/654 |
| 3,992,432 | 11/1976 | Napier et al. | 560/236 |
| 3,994,860 | 11/1976 | Brousse | 528/174 |
| 4,029,582 | 6/1977 | Ishii et al. | 521/27 |
| 4,173,693 | 11/1979 | Au et al. | 525/369 |
| 4,208,508 | 6/1980 | Hashino et al. | 528/175 |
| 4,230,463 | 10/1980 | Henis et al. | 427/245 |
| 4,273,903 | 6/1981 | Rose | 528/174 |
| 4,283,563 | 8/1981 | Kawabata et al. | 568/454 |
| 4,286,015 | 8/1981 | Yoshida et al. | 428/306.6 |
| 4,351,860 | 9/1982 | Yoshida et al. | 428/419 |
| 4,353,802 | 10/1982 | Hara et al. | 210/654 |
| 4,427,419 | 1/1984 | Li | 55/16 |
| 4,431,793 | 2/1984 | Rosenquist | 528/198 |

FOREIGN PATENT DOCUMENTS 1227144 4/1971 United Kingdom .

OTHER PUBLICATIONS

Charles M. Starks—J. Am. Chem. Socty., vol. 93, No. 1; pp. 195–199 (Jan. 13, 1971).

Primary Examiner—Veronica P. Hoke
Attorney, Agent, or Firm—Sue E. Phillips; Joseph G. Curatolo; Larry W. Evans

[57] ABSTRACT

A process for the modification of alkyl halogenated polyarylenes with a derivative compound comprising the steps of forming a mixture of the derivative compound with a phase transfer catalyst, wherein the derivative compound has the formula H—Z or M—T and Z is derived from a compound selected from the group consisting of water or alcohols, thiols, amines, iminos and imides containing at least one O, N or S atom bonded to the H, M is Na or K and T is derived from a compound selected from the group consisting of cyanides, iminos, imides, carboxyls and hydroxyl; combining the mixture with the alkyl halogenated polyarylene in an organic solvent to form a second mixture; agitating the second mixture until the desired degree of substitution has taken place and thereafter separating the modified polyarylene which contains a Z or a T group.

46 Claims, No Drawings

PROCESS FOR THE MODIFICATION OF AROMATIC POLYMERS VIA PHASE TRANSFER CATALYSIS TO PRODUCE POLYARYLENE POLYMERS AND THE USE THEREOF

TECHNICAL FIELD

This invention relates to the modification of polyarylenes, particularly polyphenylene oxides, to produce many new polymers having utility as semipermeable membranes for the separation of gases and liquids, as engineering plastics, as coating and encapsulating agents. The modification takes place in the presence of a phase transfer catalyst and permits substitution onto the polyarylene of groups such as aliphatic and aromatic ethers, aminoethers, imides, amines, hydroxides, esters and nitriles.

The process of modification is novel and provides a most versatile means for providing these eight types of derivatives onto the host polymer. As a result, the invention provides for the easy adjustment of glass transition temperature making the polymer obtained suitable in coating and encapsulating applications. The resulting polymers can also be provided with a wide range of crystallinity, strength, impact and stiffness properties which, in many instances, will provide alloying polymers for upgrading commodity polymers.

BACKGROUND ART

Notwithstanding the variety of uses to which the novel polymers of this invention can be put, their use as semipermeable membranes is of current interest and shall accordingly be noted herein. Semipermeable membranes comprising polyarylenes containing a variety of substituent groups and the process for their preparation have been set forth in several patents, owned by the Assignee of record herein, and include U.S. Pat. Nos. 4,586,939, 4,521,224 and 4,596,860. Unlike the inventions disclosed in those applications, the present invention provides for the synthesis of additional substituted polymers and via a novel process empolying phase transfer catalysis.

DISCLOSURE OF THE INVENTION

In general, the process for the modification of alkyl halogenated polyarylenes with a derivative compound according to the process of the present invention comprises the steps of forming a mixture of the derivative compound with a phase transfer catalyst, wherein the derivative compound has the formula H-Z or M-T and Z is derived from a compound selected from the group consisting of water or alcohols, thiols, amines, iminos and imides containing at least one O, N or S atom bonded to the H; M is Na or K and T is derived from a compound selected from the group consisting of cyanides, iminos, imides, carboxyls and hydroxyl. The mixture thus formed is combined with the alkyl halogenated polyarylene in an organic solvent to form a second mixture which is then agitated until the desired degree of substitution has taken place and thereafter, the modified polyarylene which contains a Z or a T group is separated.

The foregoing alkyl halogenated polyarylenes have the formula

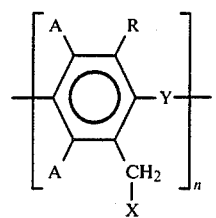

wherein R is a $C_1$ to $C_{10}$ aliphatic or a $C_5$ to $C_7$ cycloaliphatic radical or an aryl radical having the formula

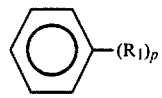

wherein each $R_1$ is independently a $C_1$ to $C_{10}$ aliphatic radical and p is an integer of 0 to 4; X is a halogen such as F, Cl, Br and I; A is hydrogen, halogen, an aliphatic or an aryl radical; Y is a divalent oxygen or sulfur atom or a carbonate group and n is an integer of from about 75 to about 10,000.

The present invention also provides novel polyarylene polymers having the formula

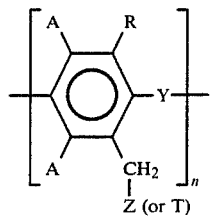

wherein R, Y, A, Z, T and n are as described before.

The foregoing modified polymers have at least one utility as semipermeable membranes and accordingly the present invention also provides a process for the separation of gases from a mixture containing at least two gases into two fractions, one fraction being enriched with at least one of the gases and the other fraction being depleted in the same. The process is practiced by contacting the gaseous mixture with one of the foregoing novel polymers as a semipermeable membrane in such a manner that a portion of the gaseous mixture selectively passes through the membrane resulting in the enriched fraction being on one side of the membrane and the depleted fraction being on the other side of the membrane.

PREFERRED EMBODIMENT FOR CARRYING OUT THE INVENTION

The process for the modification of alkyl halogenated polyarylenes is accomplished by the following general mechanism:

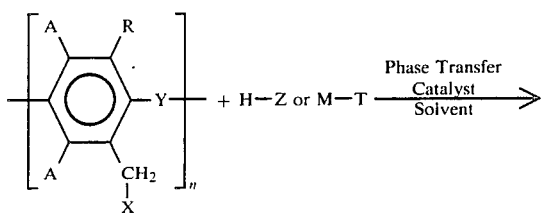

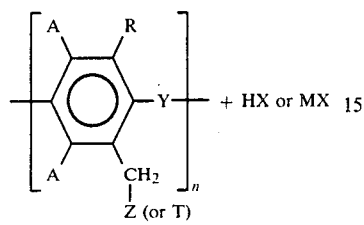

As noted above, Y can be divalent oxygen, —O—, divalent sulfur, —S—, or a carbonate group

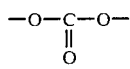

The definition of Y can vary from arylene unit to arylene unit and thus a polymer of formula III can contain all three linkages although preferably the X linkage has the same definition throughout the polymer, i.e., all carbonate, all oxygen or all sulfur. Divalent oxygen is the preferred definition of Y.

Typical groups represented by A in formula III in addition to hydrogen include halogens, i.e., F, Cl, Br and I, the aliphatics described in conjunction with R and aryl radicals such as phenyl, tolyl, xylenyl, phenethyl and the like.

Typical aliphatic groups represented by R in formula I and the foregoing equation include methyl, ethyl, propyl, hexyl, cyclohexyl, cyclohexenyl and the like. Where R is an aryl, as described in formula II, nonpolymeric aryl radicals such as phenyl, tolyl, xylenyl, phenethyl and the like are contemplated. Thus, suitable compounds can be unsubstituted aryl, where p=0, or alkylaryl or arylalkyl radicals. If desired, R can contain inert substituents, i.e., substituents that are nonreactive with the components of the permeant under separation conditions, although preferably R is free of any such substituents. R is preferably a $C_1$ to $C_4$ alkyl radical and most preferably a methyl radical. $R_1$ in the definition of formula II shares the $C_1$ to $C_{10}$ aliphatics discussed in conjunction with R hereinabove.

Methyl brominated polyphenylene oxide (PPO) is a preferred material where the R group is methyl, X is bromine and the A groups are hydrogen. The weight average molecular weight of this material is typically at least about 20,000 and preferably at least about 50,000. The maximum weight average molecular weight is limited only by practical considerations, particularly the film-forming ability of the polymer, but typically it does exceed about 1,000,000 weight average molecular weight. Polyphenylene oxide polymers and their preparation are defined at length in U.S. Pat. No. 3,350,844, the subject matter of which is incorporated herein by reference. Benzylic halogenation can be effected by a procedure set forth hereinbelow.

The foregoing polymer can contain another organic group or ring. Halogenation can be provided in a conventional modification and as such the technique by which this is achieved does not constitute a novel aspect of the present invention. Similarly, apart from the modification process of the present invention, the presence of other organic groups to the ring is not a novel aspect of the process inasmuch as these can be provided either by monomer selection or by employing other ring modification reactions.

With respect next to the derivative compounds, designated by the letter Z hereinabove and which can be substituted for the X halogen in formula I, it has been noted that the process of the present invention is applicable to alcohols, thiols, amines, iminos and imides as well as hydroxyl. More particularly, alcohols having the formula can be employed where $R_2$ is a $C_1$ to $C_{20}$ aliphatic, a $C_5$ to $C_7$ cycloaliphatic or an aryl radical having the formula

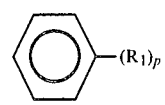

as previously described.

In addition to aliphatic, cycloaliphatic and aromatic alcohols, amino alcohols can also be employed having the formula

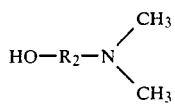

Sulfonyl alcohols having the formula

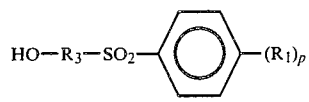

where $R_3$ is a $C_1$ to $C_{20}$ aliphatic can also be employed.

Exemplary alcohols include for instance

| | |
|---|---|
| $CH_3(CH_2)_5OH$ | hexyl alcohol, |
| $CH_3(CH_2)_6OH$ | 1-heptanol, |
| $CH_3(CH_2)_7OH$ | 1-octanol, |
| $CH_3(CH_2)_8OH$ | 1-nonanol, |
| $CH_3(CH_2)_9OH$ | 1-decanol, |
| $CH_3(CH_2)_{10}OH$ | 1-undecanol, |
| $CH_3(CH_2)_{13}OH$ | 1-tetradecanol, |
| $CH_3(CH_2)_{15}OH$ | 1-hexadecanol, |
| $CH_3(CH_2)_8C_6H_4OH$ | p-nonylphenol, |

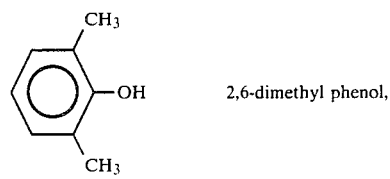

2,6-dimethyl phenol,

-continued

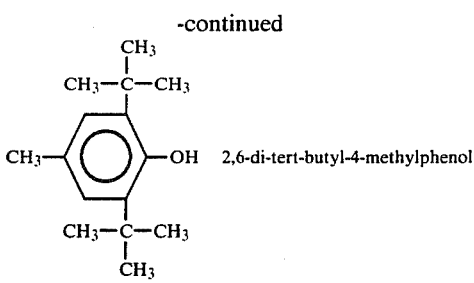 2,6-di-tert-butyl-4-methylphenol and the like.

Exemplary aminoalcohols include for instance

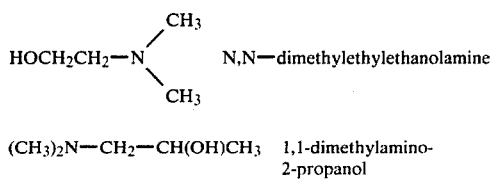 N,N—dimethylethylethanolamine (CH₃)₂N—CH₂—CH(OH)CH₃   1,1-dimethylamino-2-propanol

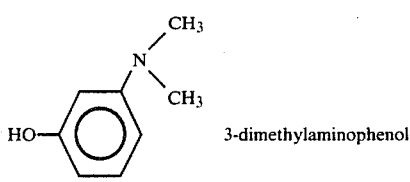 3-dimethylaminophenol

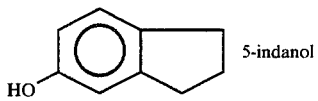 5-indanol and the like.

An exemplary sulfonyl alcohol is

CH₃C₆H₄SO₂CH₂CH₂OH   2-p-toluenesulfonylethanol.

Thiols having the formula

R₂—SH where R₂ is as previously described can likewise be selected.

Exemplary amines include for instance

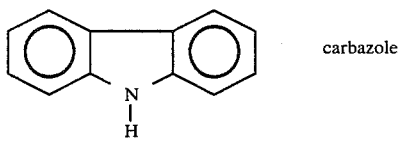 carbazole

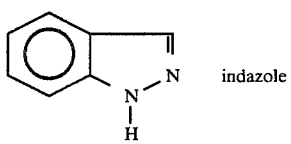 indazole

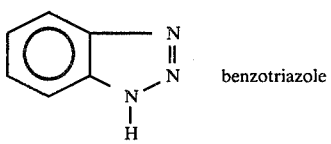 benzotriazole

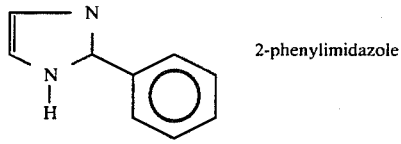 2-phenylimidazole can be employed.

Exemplary imides and iminos include respectively for instance

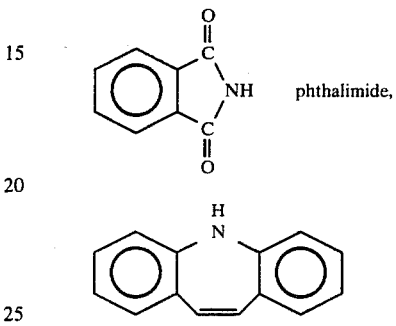 phthalimide,

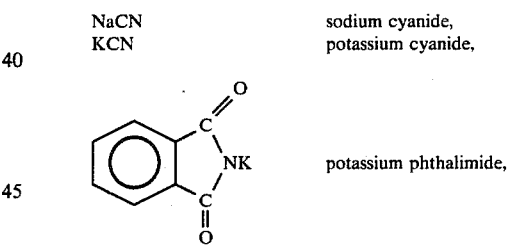 iminostilbene and the like.

Where Z is —OH the hydroxyl group is provided by water which is available in the reaction medium as will be explained hereinbelow.

With respect to the metal salts, M as noted hereinabove can be either Na or K and T will be a nitrile —CN, an imide e.g., phthalimide, an imino, e.g., iminostilbene, discussed hereinabove or a monocarboxylic acid group having from one to about 20 carbon atoms or a hydroxide. Exemplary compounds include

| NaCN | sodium cyanide, |
| KCN | potassium cyanide, |

 potassium phthalimide,

| CH₃COOK | potassium acetate |
| NaOH | sodium hydroxide |
| KOH | potassium hydroxide | and the like.

R₂ and R₃ in the foregoing formulae can be any linear or branched hydrocarbon having from one to about 20 carbon atoms including saturated compounds such as methyl, ethyl, propyl, butyl, t-butyl, octyl, hexadecyl and the like, as well as unsaturated, e.g., alkenes, alkynes and the like.

R₂ can also be an aryl radical of the formula

as noted hereinabove where each R₁ is independently a C₁ to C₁₀ aliphatic radical, and p is an integer of 0 to 4.

If p is a positive integer (greater than 0), preferably it is 1 or 2 and then $R_1$ is preferably a $C_1$ to $C_3$ alkyl radical.

$R_2$ can thus also be any nonpolymeric aryl radical, such as phenyl, tolyl, xylylenyl, and phenethyl. By nonpolymeric is meant that the aryl radical is not part of a polymer chain, i.e., the aryl radical of an arylene unit of another polymer strand of formula I does not link two independent polymer strands. However, the aryl radical here includes multi-ring compounds such as biphenyl, diphenyloxide and the like. Preferred aryl radicals are phenyl, tolyl, xylenyl and phenethyl.

The process of the present invention requires the preparation of two solution mixtures which will then be combined together. One such mixture contains the derivative compound while the other mixture contains the halogenated polyarylene compound. As is known in the field of phase transfer catalysis, the two mixtures are preferably imiscible, one of the functions the catalyst provides is the means of transferring a given compound from one mixture or phase to the other. The explanation shall procede with preparation of the derivative compound mixture initially although the order of preparation and addition to the reaction vessel is not crucial.

Where the derivative compound is represented by the formula H-Z, the mixture should contain an aqueous base such as NaOH or KOH and the phase transfer catalyst. With respect to the base, which also provides an amount of water, a concentration of from about 20 to 70 weight percent is a useful range with 50 percent being preferred. As an aside, where the hydroxyl group is to be transferred to the polyarylene, water of the base is the derivative compound, e.g., the invention can be practiced with water (H-Z=H-OH) or with a base (M-T=Na-OH or K-OH), the latter case being addressed again hereinbelow. The amount of aqueous NaOH to be employed is minimally stoichiometric, although the use of an excess, e.g., twice the amount is preferred.

The phase transfer catalyst component is mixed thoroughly with the other component prior to the introduction of the polyarylene mixture. The process of the present invention can be conducted as a liquid-liquid phase transfer process or a solid-liquid phase transfer process. Where the derivative compound is H-Z, liquid-liquid phase, quaternary ion catalysts, e.g., ammonium and phosphonium salts, are employed as the phase transfer catalyst. These onium salts are described by Starks and Napier in Br. Pat. No. 1,227,144 and by Starks in J. Amer. Chem. Soc., 93, 195 (1971). Suitable onium salts have a minimum solubility of at least about 1 weight percent in both the organic and the aqueous phase at 25° C. Ammonium salts are preferred over phosphonium salts and tri-n-butylmethyl-, triphenylmethyl-, benzyltriethyl- and tetra-n-butylammonium chlorides, bromides and bisulfates are most preferred.

Chloride and bisulfate are the preferred anions but other representative anions include fluoride, bromide, iodide, tosylate, acetate and the like. The following compounds are a nonlimiting illustration: tetraalkylammonium salts, such as tetra-n-butyl-, tri-n-butylmethyl-, and tridecylmethylammonium chlorides, bromides, iodides, bisulfates, tosylates and the like; alkylaryl ammonium salts, such as tetrabenzyl-, benzyltrimethyl-benzyltriethyl-, benzyltributyl-, and phenethyltrimethylammonium chlorides, bromides, iodides and the like; arylammonium salts, such as triphenylmethyl-, ammonium fluoride, chloride or bromide, N,N,N-trimethyl-n-phenylammonium chloride, N,N,N-triethyl-N-phenylammonium bromide, N,N-diethyl-N,N-diphenylammonium bisulfate, trimethylnaphthylammonium chloride, p-methylphenyltrimethylammonium chloride or tosylate and the like; 5- and 6-membered heterocyclic compounds containing at least one quarternary nitrogen atom in the ring, such as N,N-dibutylmorpholinium chloride and the like; and the corresponding phosphonium salts.

A catalytic amount of a quaternary ammonium or phosphonium salt is here used. The concentration will vary with the particular reagents employed but best results are generally achieved when the maximum onium salt:polymer mole equivalents ratio is about 10:1. The minimum onium salt:polymer mole equivalents ratio generally employed is about 0.1:1 and preferably about 0.3:1.

For a more detailed discussion of phase transfer catalysts, reference can be made to U.S. Pat. No 4,173,693, the subject matter of which is incorporated herein by reference. A general formula is presented in the patent which encompases the foregoing list of suitable catalysts. Additional references can be made to available textbooks containing information on phase transfer catalysts. Overall, it is believed that such catalysts are well enough known that one of ordinary skill shall be able to select a particular catalyst best suited for the modification process that is desired. With this understanding is a recognition that certain catalysts will promote a faster reaction than others in a given modification process.

The process of the present invention is likewise applicable to solid-liquid phase transfer, the likes of which occur where the modifying compound is a metal salt of the formula M-T. These salts, as previously described, include sodium and potassium derivatives of nitriles, imides, iminos and carboxylates as well as hydroxides. In this instance the phase transfer catalyst is preferably a crown ether. Crown ethers are defined as macroheterocycles usually containing the basic unit $(Y-CH_2-CH_2-)$ where Y is O, S or N. They are exemplified by 18-crown-6 in which 18 indicates the number of atoms in the ring, crown indicates the class and 6 indicates the number of oxygen atoms. Other common commercially available crown ethers are dibenzo-18-crown-6, dicyclohexano-18-crown-6 and 15-crown-5.

With certain compounds, such as potassium cyanide, use of a crown ether is without an aqueous base as a solvent and therefore the solution mixture of derivative compounds M-T comprises a solid phase, or more accurately, slurry, of the salt M-T and crown ether as the phase transfer catalyst. An exception to the foregoing might be found where M-T is NaOH or KOH, i.e., an aqueous base is present. However, the base is not the solvent but rather the derivative compound. In this instance, a crown ether can be employed or one of the other phase transfer catalysts can be selected and the process is again a liquid-liquid phase. The amount of crown ether employed is the same as for the quaternary ammonium or phosphonium salts, 10:1 to 0.1 to 1, moles of catalyst to moles of polymer.

As a separate step of the process, the alkylhalogenated polyarylene compound is dissolved in a non-polar organic solvent such as benzene, toluene, xylene, chlorinated hydrocarbons or the like to form a solution containing from about one to 20 percent polymer by weight. The solvent chosen should be substantially immiscible with the mixture of the derivative compound previously described in order that a phase transfer reaction occur.

The polyarylene solution mixture is combined slowly with the derivative compound mixture with agitation, the order of addition not being important, as noted hereinabove. During the combination the temperature is allowed to reach about 60° C. and agitation, in the form of stirring or shaking is continued until the desired degree of substitution has taken place, generally for at least six hours. More broadly, the temperature can range between about 20° and 100° C. with 60° to 80° C. being preferred. Reaction time varies with the temperature and with the catalyst selected. The time range at 60° C. for a quaternary salt is about six to 40 hours, however, in the presence of crown ether, the reaction slows down to about 40 hours and may continue for 168 hours.

After the reaction is complete, the polymer solution is washed several times with water until a neutral pH is obtained, and then separated and dried over $MgSO_4$ or otherwise to recover the modified polymer which is filtered and precipitated over methanol.

As noted hereinabove, the process of the present invention permits the synthesis of many novel polymers useful in a variety of applications. One such application of particular interest is the use of these polymers as semipermeable membranes for the separation of any one of a number of different gases such as hydrogen, helium, nitrogen, oxygen, carbon monoxide, carbon dioxide, hydrogen sulfide, ammonia, water (vapor) and $C_1$ to $C_4$ hydrocarbons from mixtures containing the same. Typical gas mixtures where separation is desirable include $H_2/N_2$; $H_2/CO$; $H_2/C_1$ to $C_4$; $H_2/O_2$; $H_2/NH_3$; $CO_2/C_1$ to $C_4$; $CO_2/N_2$; $H_2S/C_1$ to $C_4$; $O_2/N_2$; $N_2/NH_3$; $He/C_1$ to $C_4$; $H_2S/C_1$ to $C_4$ and $H_2O/C_1$ to $C_4$ and mixtures of gaseous hydrocarbons. The membrane can also be employed for the separation of mixtures comprising three gases or more. It is to be understood that not all gas pairs or mixtures will be separated optimally over a given membrane of the present invention. So long as the membrane exhibits a selectivity for at least one gas in a mixture, it has utility for that particular mixture. The semipermeable membranes of this invention find particular utility for the separation of gaseous carbon dioxide-methane mixtures into the constituent parts, i.e., enriched fractions of carbon dioxide and methane.

Membranes comprising these modified polymers are also useful for separating liquid mixtures, such as ethanol-water, water-aldehyde, salt water, carboxylic acid-water and the like. If used to separate liquid mixtures into their constituent parts, then these membranes are used in the same manner as known membranes for these separations. Furthermore, these membranes can be used in any one of a number of different manners including reverse osmosis and pervaporation, the latter being a combination of permeation and evaporation. Thus, the present invention also includes a process for the separation of gases employing novel semipermeable membranes derived from the modification process set forth herein.

The following examples are illustrative of specific embodiments of this invention and unless indicated to the contrary, all parts and percentages are by weight.

SPECIFIC EMBODIMENTS

Bromination of Polyphenylene Oxide at Benzylic Position

As an example of an alkyl halogenated polyarylene material that can be modified by the process of this invention, benzylic-brominated poly(2,6-dimethyl-p-phenylene oxide) was selected. It was itself prepared by placing 8 g of poly(2,6-dimethyl-p-phenylene oxide) and 600 ml tetrachloroethane in a three-necked flask equipped with a stirrer, a dropping funnel and a condenser. The contents were heated until refluxing began and then 10.98 g of bromine diluted with 160 ml of tetrachloroethane was added dropwise. After the completion of the addition, refluxing was continued with stirring for 1.5 hours. The reaction mixture was then poured into a large amount of methanol to precipitate the polymer. The precipitation and purification operations were repeated using a chloroform/methanol system.

In the examples which follow, nine separate modifications of methyl brominated PPO, as prepared hereinabove, have been reported. For Examples No. 1-9, modification by phase transfer catalysis according to the process of the present invention commenced with the introduction of NaOH and derivative compound and the phase transfer catalyst (PTC) into a 500 ml three necked flask equipped with a mechanical stirrer, condenser and dropping funnel. To this mixture was added the methyl brominated PPO in an organic solvent with vigorous stirring for five minutes at room temperature. The flask was then heated to a reaction temperature and maintained there for a time, both of which are noted. At the end of the reaction time, the reaction mixture was then washed with water until the pH was neutral following which the separated polymer solution was dried on $MgSO_4$, filtered and precipitated in methanol.

EXAMPLE NO. 1

Reaction of Methyl Brominated PPO With Aliphatic Alcohol

NaOH:
  50% solution
  0.03 moles, 1.2 g
  2.4 ml
Catalyst:
  tetrabutylammonium hydrogen sulfate
  $(CH_3(CH_2)_3)_4NHSO_4$
  0.0015 moles
  0.51 g
Derivative Compund:
  hexyl alcohol
  0.03 moles
  3.19 g
PPO-MeBr/Solvent: 5 g methyl brominated PPO dissolved in 400 ml benzene
Reaction temperature: 80° C.
Reaction time: 8 hours Reaction

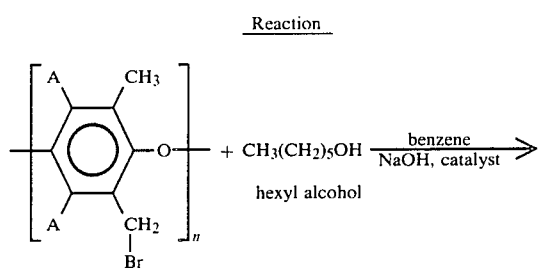
hexyl alcohol

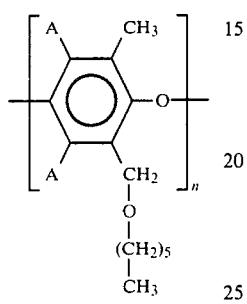

EXAMPLE NO. 2

Reaction of Methyl Brominated PPO With p-Nonylphenol

NaOH:
 50% solution
 0.03 moles, 1.2 g
Catalyst:
 tetrabutylammonium hydrogen sulfate
 0.0015 moles
 0.51 g
Derivative Compund:
 nonylphenol
 0.03 moles
 6.61 g
PPO-MeBr/Solvent: 5 g brominated PPO dissolved in 400 ml benzene
 Reaction temperature: 80° C.
 Reaction time: 12 hours Reaction

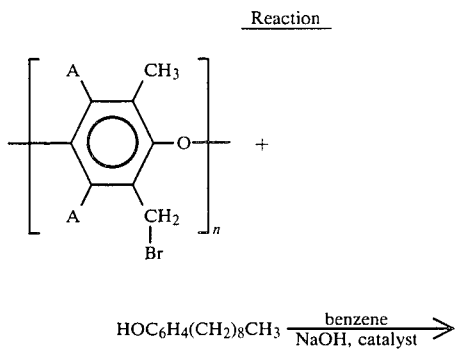

-continued

Reaction

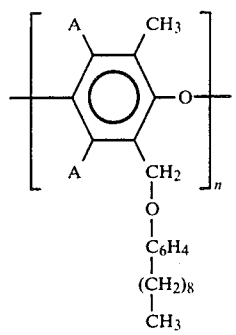

EXAMPLE NO. 3

Reaction of Methyl Brominated PPO With Amino Alcohols

NaOH:
 50% solution
 0.03 moles, 1.2 g
Catalyst:
 tetrabutylammonium hydrogen sulfate
 0.0015 moles
 0.15 g
Derivative Compund:
 N,N-dimethylethanolamine
 0.03 moles
 2.69 g
PPO-MeBr/Solvent: 5 g brominated PPO dissolved in 400 ml benzene
 Reaction temperature: 60° C.
 Reaction time: 8 hours Reaction

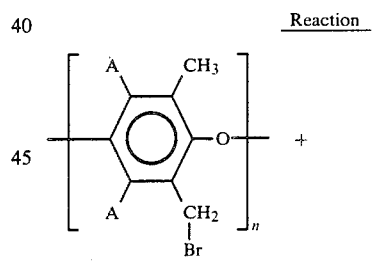

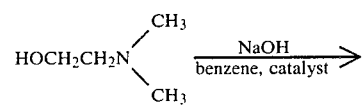

N,N—Dimethylethanolamine

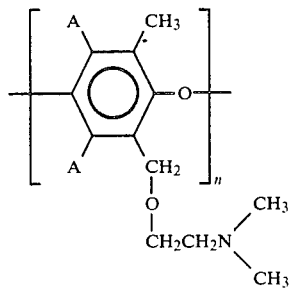

EXAMPLE NO. 4

Reaction of Methyl Brominated PPO With Sulfonyl Alcohols

NaOH:
  50% solution
  0.015 moles
  0.6 g
Catalyst:
  tetrabutylammonium hydrogen sulfate
  0.0075 moles
  0.25 g
Derivative Compund:
  2-p-toluenesulfonylethanol
  0.015 moles
  3 g
PPO-MeBr/Solvent: 2.5 g methyl brominated PPO dissolved in 200 ml benzene
  Reaction temperature: 80° C.
  Reaction time: 16 hours Reaction

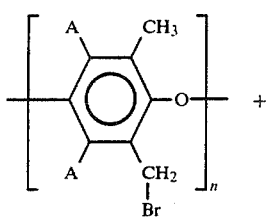

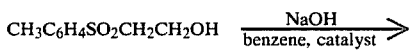

2-p-toluenesulfonylethanol

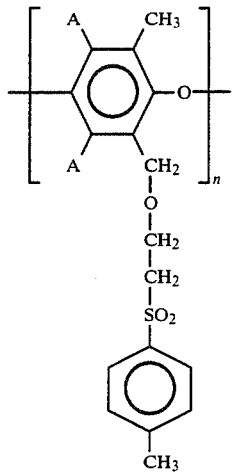

EXAMPLE NO. 5

Reaction of Methyl Brominated PPO With Amino Compounds

NaOH:
  50% solution
  0.03 moles
  1.2 g
  Total amount 3.6 g
  Note, NaOH was used in excess
Catalyst:
  tetrabutylammonium hydrogen sulfate
  0.0015 moles
  0.51 g
Derivative Compund:
  indazole
  0.03 moles
  3.54 g
  Total amount 7.08 g
  Note, excess of indazole was used
PPO-MeBr/Solvent: 5 g methyl brominated PPO in 400 ml benzene
  Reaction temperature: 80° C.
  Reaction time: 40 hours Reaction

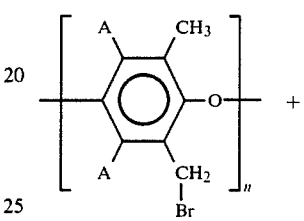

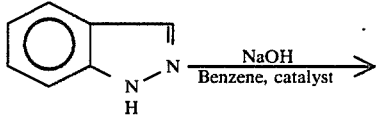

indazole

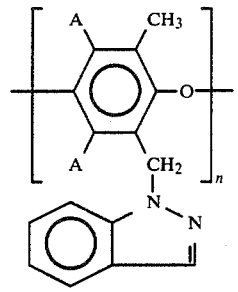

EXAMPLE NO. 6

Reaction of Methyl Brominated PPO With Potassium Cyanide

Catalyst:
  18-crown-6
  0.0015 moles, 0.4 g
  0.8 g
Derivative Compund:
  Potassium cyanide
  0.03 moles
  1.95 g
  Note, KCN was used in excess
  Total amount 4 g
PPO-MeBr/Solvent: 5 g PPO dissolved in 400 ml benzene
  Reaction temperature: 80° C.
  Reaction time: 168 hours
  Purification: Filter the KBr and unreacted KCN from reaction mixture prior to polymer precipitation Reaction

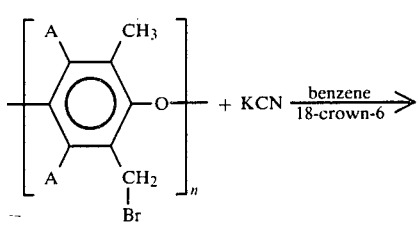 + KCN $\xrightarrow{\text{benzene}}{\text{18-crown-6}}$

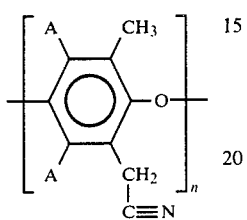

EXAMPLE NO. 7

Reaction of Methyl Brominated PPO With Phthalimide Potassium Derivative

Catalyst:
  18-crown-6
  0.0015 moles, 0.4 g
Derivative Compound:
  potassium phthalimide
  0.03 moles
  5.56 g
  Total added 11.12 g (excess)
PPO-MeBr/Solvent: 5 g PPO dissolved in 400 ml benzene
Reaction temperature: 80° C.
Reaction time: 96 hours
Purification: Filter KBr and excess potassium phthalimide salt from reaction mixture prior to polymer precipitation Reaction

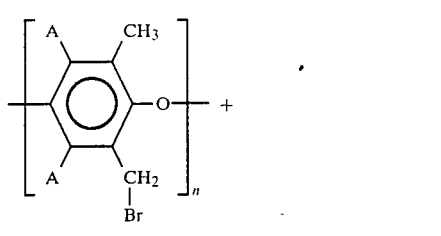 +

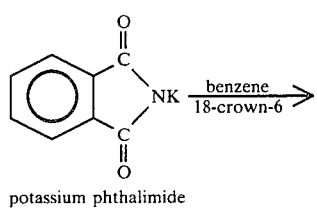 $\xrightarrow{\text{benzene}}{\text{18-crown-6}}$ potassium phthalimide -continued
Reaction

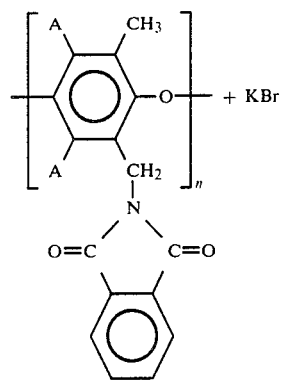 + KBr

EXAMPLE NO. 8

Reaction of Methyl Brominated PPO With Carboxylic Acid Potassium Salt

Catalyst:
  18-crown ether-6
  0.0015 moles, 0.4 g
Derivative Compund:
  potassium acetate
  0.003 moles
  2.94 g
PPO-MeBr/Solvent: 5 g methyl brominated PPO dissolved in 400 ml benzene
Reaction temperature: 60° C.
Reaction time: 16 hours
Purification: Filter KBr and unreacted CH₃COOK from reaction mixture prior to polymer precipitation Reaction

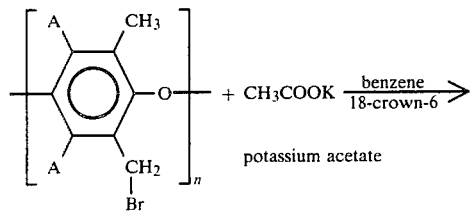 + CH$_3$COOK $\xrightarrow{\text{benzene}}{\text{18-crown-6}}$ potassium acetate

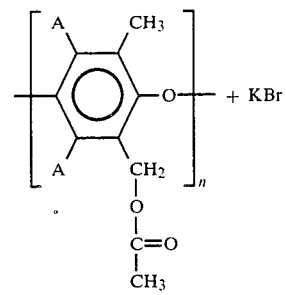 + KBr

Having demonstrated the modification of methyl brominated polyphenylene oxide via phase transfer catalysis, three additional modifications were conducted and the resultant polymers were then tested as is next reported. In Examples No. 9 and 10 modification was conducted with octyl and nonyl alcohol, respectively. In Example No. 11 modification was conducted with benzotriazole.

EXAMPLES NO. 9 and 10

Glass transition temperature and crystallinity were determined and compared with the unmodified methyl brominated PPO as a control. Results appear in Table I and demonstrate the improved properties of these polymers.

TABLE I

Effect of Modification on Glass Transition Temperature and Crystallinity

| Ex. No. | Polymer | Tg | Crystallinity |
|---|---|---|---|
| Control | Methyl-Br—PPO | 210 | 34.4% |
| 10 | PPO—O—$(CH_2)_7CH_3$ | 60 | 19.5% |
| 11 | PPO—O—$(CH_2)_8CH_3$ | 50 | 19.0% |

EXAMPLE NO. 11

Another methyl brominated PPO was modified with benzotriazole and then utilized in a test to evaluate its performance as a semipermeable membrane. A film of the polymer was cast and then employed in a modified Gilbert cell as set forth in application, U.S. Pat. No. 4,596,360, the subject matter of which is incorporated herein by reference.

Semipermeable membranes comprising the novel aromatic polymer synthesized herein can be manufactured by any conventional method. In one embodiment, the polymer is dissolved in a suitable solvent to form about a five to about 20 weight percent solution and preferably a seven to about 15, weight percent solution. Generally any polar solvent can be employed with chloroform, dimethylformamide, dimethylsulfoxide, dimethylacetamide, acetone and methylethyl ketone being exemplary. The solution is then poured over a clean glass plate and spread evenly to a uniform thickness with the aid of a doctor blade. The membranes are then air dried, removed from the glass plate and further dried in air under ambient conditions for a suitable period of time, generally in excess of 24 hours. In other embodiments, these membranes can be manufactured by the various laboratory and commercial techniques known in the art. These membranes can also be manufactured in structures other than films, such as; hollow fibers.

The membranes of this invention can be cast at any desirable thickness although membranes having a thickness between 625 microns and 1,000 angstroms, preferably between 250 microns and 1,000 angstroms. These membranes demonstrate good permeability, durability, flexibility, strength and corrosion resistance. When subjected to a mixture of carbon dioxide/methane/nitrogen in a mole ratio of 2.99:32:65, the membrane exhibited a permeability $\bar{P}$ as follows: $\bar{P}CH_4 = 0.45$; $\bar{P}CO_2 = 11.26$; $\bar{P}N_2 = 0.85$. Selectivity of $CO_2$ to $CH_4$ was found to be 25.02, a useful value as compared to unmodified PPO films which we have found previously to be only about 20.

An increase in permeability for $CH_4$ was obtained when polyphenylene oxide was modified to contain long side chains. This was observed and demonstrated by preparation of PPO-O-$(CH_2)_{14}CH_3$ which was tested as in Example No. 11. Results recorded were $\bar{P}CO_2 = 57.0$; $\bar{P}CH_4 = 20.6$; selectivity of $CO_2$ to $CH_4$ was a very low 2.8 which would make such a polymer membrane useful for separating hydrocarbon mixtures given the increased permeability to $CH_4$.

Thus, it has been demonstrated herein that the process of the present invention is useful for the modification of alkyl halogenated polyarylene oxides with phase transfer catalysts. The derivative groups substituted thereon result in the formation of many novel polymers having good solubilities, thereby enhancing the possibility of casting semipermeable membrane films from a large number of solvents many of which would not be useful for the dissolution of unmodified PPO.

It is to be understood that the novel polymers and permselective membranes prepared therefrom can comprise other components than the modified PPO materials exemplified herein, the examples having been provided merely to demonstrate practice of the subject invention. Those skilled in the art may readily select other polyarylenes and derivative compounds, e.g., alcohols, thiols, imides, amines, nitriles, carboxyls and hydroxyl as well as others according to the disclosure made hereinabove.

Lastly, although operability of the process to separate $CO_2$ from $CH_4$ and $N_2$ has been demonstrated herein, with at least one modified polymer membrane, the novel polymers of the present invention and process for separating gases therewith can be employed with other gas mixtures so long as the members of a given pair have different permeability rates from each other.

Thus, it is believed that any of the variables disclosed herein can readily be determined and controlled without departing from the spirit of the invention herein disclosed and described. Moreover, the scope of the invention shall include all modifications and variations that fall within the scope of the attached claims.

We claim:

1. A process for the modification of alkyl halogenated polyarylenes with a derivative compound comprising the steps of:

forming a mixture of said derivative compound with a phase transfer catalyst, wherein said derivative compound has the formula

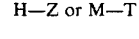

H—Z or M—T and Z is derived from a compound selected from the group consisting of water; aromatic, aliphatic, cycloaliphatic, amino and sulfonyl alcohols; aryl, aralkyl, aliphatic and cycloaliphatic thiols; heterocyclic amines; and heterocyclic imides and iminos which contain at least one O, N or S atom bonded to said H; M is Na or K and T is derived from a compound selected from the group consisting of cyanides; heterocyclic imides and iminos; carboxyls and hydroxyls;

combining said mixture with said alkyl halogenated polyarylene in an organic solvent to form a second mixture, said alkyl halogenated polyarylenes having the formula

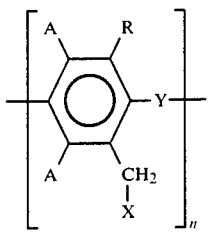

where R is a $C_1$ to $C_{10}$ aliphatic or a $C_5$ to $C_7$ cycloaliphatic radical or an aryl radical having the formula

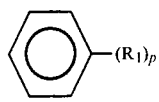

wherein each $R_1$ is independently a $C_1$ to $C_{10}$ aliphatic radical and p is an integer of 0 to 4; X is a halogen such as F, Cl, Br and I; A is hydrogen, halogen, an aliphatic or an aryl radical; Y is a divalent oxygen or sulfur atom or a carbonate group and n is an integer of from about 75 to about 10,000; agitating said second mixture until the desired degree of substitution has taken place and thereafter;

separating the modified polyarylene which contains a benzylic substituted Z or a T group in place of the halogen.

2. A process for the modification of alkyl halogenated polyarylenes, as set forth in claim 1, wherein said step of combining is conducted at a temperature range of from about 20° C. to 60° C. and said step of agitating is conducted at a temperature of from about 20° C. up to about 100° C.

3. A process for the modification of alkyl halogenated polyarylenes, as set forth in claim 1, wherein said mixture also contains an aqueous base.

4. A process for the modification of akyl halogenated polyarylenes, as set forth in claim 1, wherein said organic solvent is benzene.

5. A process for the modification of alkyl halogenated polyarylenes, as set forth in claim 1, wherein H-Z represents an alcohol selected from the group consisting of

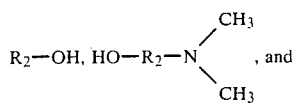

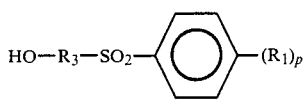

where $R_2$ is a $C_1$ to $C_{20}$ aliphatic, a $C_5$ to $C_7$ cycloaliphatic or an aryl radical having the formula

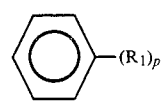

where $R_1$ is independently a $C_1$ to $C_{10}$ aliphatic and p is an integer of 0 to 4; and $R_3$ is a $C_1$ to $C_{20}$ aliphatic.

6. A process for the modification of alkyl halogenated polyarylenes, as set forth in claim 5, wherein H-Z is hexyl alcohol and said mixture contains sodium hydroxide.

7. A process for the modification of alkyl halogenated polyarylenes, as set forth in claim 5, wherein H-Z is nonylphenol and said mixture contains sodium hydroxide.

8. A process for the modification of alkyl halogenated polyarylenes, as set forth in claim 5, wherein H-Z is N,N-dimethylethanolamine and said mixture contains sodium hydr1oxide.

9. A process for the modification of alkyl halogenated polyarylenes, as set forth in claim 5, wherein H-Z is 2-p-toluenesulfonyl ethanol and said mixture contains sodium hydroxide.

10. A process for the modification of alkyl halogenated polyarylenes, as set forth in claim 1, wherein H-Z represents a thiol having the formula $R_2$-SH where $R_2$ to a $C_1$ to $C_{20}$ aliphatic, a $C_5$ to $C_7$ cycloaliphatic or an aryl radical having the formula

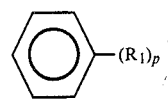

where each $R_1$ is independently a $C_1$ to $C_{10}$ aliphatic radical and p is an integer of 0 to 4.

11. A process for the modification of alkyl halogenated polyarylenes, as set forth in claim 1, wherein H-Z represents an amino compound selected from the group consisting of carbazole, indazole, benzotriazole and 2-phenylimidazole.

12. A process for the modification of alkyl halogenated polyarylenes as set forth in claim 11, wherein H-Z is indazole and said mixture contains sodium hydroxide.

13. A process for the modification of alkyl halogenated polyarylenes, as set forth in claim 1, wherein H-Z is selected from the group consisting of phthalimide and iminostilbene.

14. A process for the modification of alkyl halogenated polyarylenes, as set forth in claim 1, wherein Z represents a hydroxyl group.

15. A process for the modification of alkyl halogenated polyarylenes, as set forth in claim 15, wherein H-Z is water and said mixture contains sodium hydroxide.

16. A process for the modification of alkyl halogenated polyarylenes, as set forth in claim 1, wherein M-T is potassium cyanide.

17. A process for the modification of alkyl halogenated polyarylenes, as set forth in claim 1, wherein M-T is potassium phthalimide.

18. A process for the modification of alkyl halogenated polyarylenes, as set forth in claim 1, wherein T is a monocarboxylic acid group having from 1 to about 20 carbon atoms.

19. A process for the modification of alkyl halogenated polyarylenes, as set forth in claim 18, wherein M-T is potassium acetate.

20. Polyarylene compunds having the formula

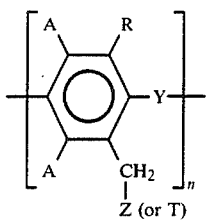

wherein R is a $C_1$ to $C_{10}$ aliphatic or a $C_5$ to $C_7$ cycloaliphatic radical, an aryl radical having the formula

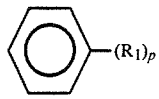

wherein each $R_1$ is independently a $C_1$ to $C_{10}$ aliphatic radical and p is an integer of 0 to 4; A is hydrogen, halogen, an aliphatic or an aryl radical; Y is a divalent oxygen or sulfur atom or a carbonate group; n is an integer of from about 75 to about 10,000; and wherein Z is derived from a compound selected from the group consisting of alcohols selected from the group consisting of

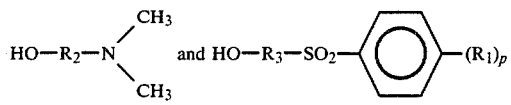

where $R_2$ is a $C_1$ to $C_{20}$ aliphatic, a $C_5$ to $C_7$ cycloaliphatic or an aryl radical having the formula

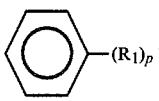

where $R_1$ and p are as above and $R_3$ is a $C_1$ to $C_{20}$ aliphatic; heterocyclic amino compounds selected from the group consisting of carbazole, indazole, benzotriazole and 2-phenylimidazole; and heterocyclic iminos and, wherein T is derived from a heterocyclic imino compound.

21. Polyarylene compounds, as set forth in claim 20, having the formula

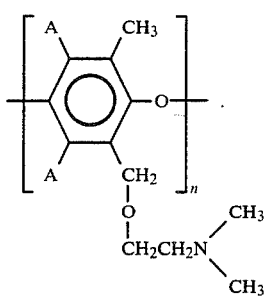

22. Polyarylene compounds, as set forth in claim 20, having the formula

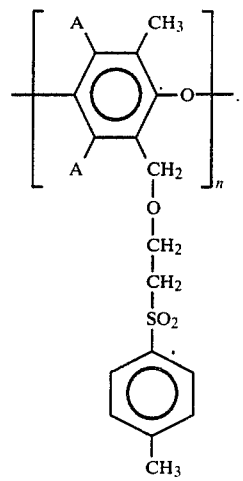

23. Polyarylene compounds, as set forth in claim 20, having the formula

[figure]

24. Polyarylene compounds, as set forth in claim 20, wherein said imino compound is iminostilbene.

25. A process for the separation of gases from a mixture containing at least two gases into two fractions, one fraction being enriched with at least one of said gases and the other fraction being depleted in same, comprising the step of:

contacting the gaseous mixture with a semipermeable membrane in such a manner that a portion of the gaseous mixture selectively passes through the membrane resulting in the enriched fraction being on one side of the membrane and the depleted fraction being on the other side of the membrane, said semipermeable membrane comprising a polyarylene compound having the formula

[figure]

wherein each R is independently a $C_1$ to $C_8$ aliphatic or a $C_5$ to $C_7$ cycloaliphatic radical, an aryl radical having the formula

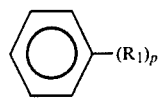

wherein each $R_1$ is independently a $C_1$ to $C_{10}$ aliphatic radical and p is an integer of 0 to 4, A is a hydrogen, halogen, an aliphatic or an aryl radical; Y is a divalent oxygen or sulfur atom or a carbonate group; n is an integer or from about 75 to 10,000; and wherein Z is derived from a compund selected from the group consisting of water; aromatic, aliphatic, cycloaliphatic, amine and sulfonyl alcohols; aryl, aralkyl, aliphatic or cycloaliphatic thiols; heterocyclic amines; and heterocyclic imides and iminos containing at least one O, N or S atom; and T is derived from the group consisting of cyanide, heterocyclic imides and iminos, carboxyls and hydroxides.

26. The process of claim 25, wherein R is a methyl radical and each A is hydrogen.

27. The process of claim 26, wherein Z is derived from an alcohol selected from the group consisting of

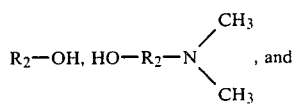

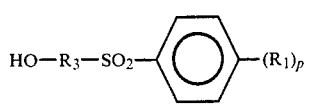

where $R_2$ is a $C_1$ to $C_{20}$ aliphatic, a $C_5$ to $C_7$ cycloaliphatic or an aryl radical having the formula

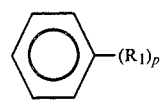

where $R_1$ is independently a $C_1$ to $C_{10}$ aliphatic and p is an integer of 0 to 4; and $R_3$ is a $C_1$ to $C_{20}$ aliphatic.

28. The process of claim 27, wherein said polyarylene has the formula

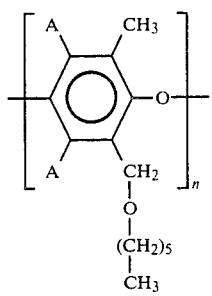

29. The process of claim 27, wherein said polyarylene has the formula

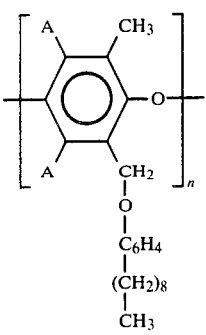

30. The process of claim 27, wherein said polyarylene has the formula

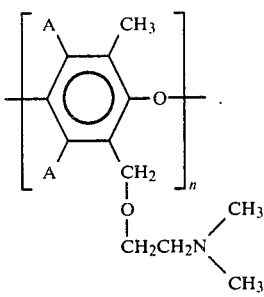

31. The process of claim 27, wherein said polyarylene has the formula

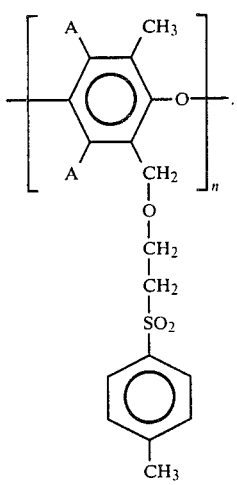

32. The process of claim 26, wherein Z is derived from an amino compound selected from the group consisting of carbazole, indazole, benzotriazole and 2-phenylimidazole.

33. The process of claim 32, wherein said polyarylene has the formula

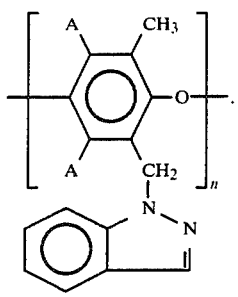

34. The process of claim 26, wherein Z is derived from a compound selected from the group consisting of phthalimide and iminostilbene.

35. The process of claim 26, wherein said polyarylene has the formula

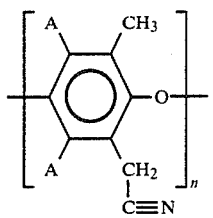

36. The process of claim 26, wherein said polyarylene has the formula

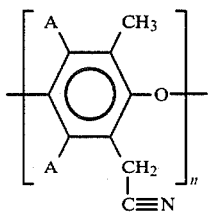

37. The process of claim 26, wherein T is derived from a compound selected from the group consisting of phthalimide and iminostilbene.

38. The process of claim 37, wherein said polyarylene has the formula

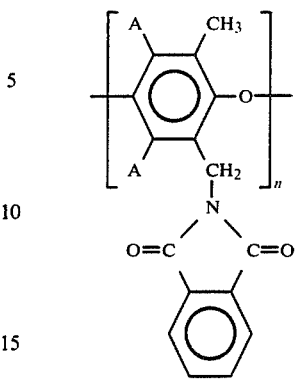

39. The process of claim 26, wherein T is a monocarboxylic acid group having from 1 to about 20 carbon atoms.

40. The process of claim 29, wherein said polyarylene has the formula

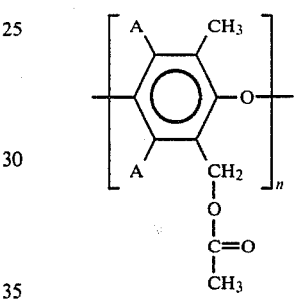

41. The process of claim 26, wherein said polyarylene has the formula

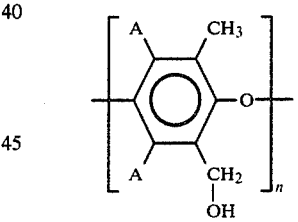

42. The process of claim 25, wherein the membrane is a hollow fiber.

43. The process of claim 42, wherein the membrane has a thickness less than about 10 mils.

44. The process of claim 25, wherein the membrane is cast as a coating on a substrate.

45. The process of claim 44, wherein the coated substrate is a hollow fiber.

46. The process of claim 25, wherein the gases in said mixture are selected from the group consisting of hydrogen, helium, oxygen, nitrogen, carbon monoxide, carbon dioxide, hydrogen sulfide, ammonia, water (vapor) and $C_1$ to $C_4$ hydrocarbons.

* * * * *